Aug. 24, 1948.  J. C. McCUNE ET AL  2,447,710
DECELERATION CONTROL APPARATUS
Filed April 29, 1944  3 Sheets-Sheet 1

INVENTORS
Joseph C. McCune
George K. Newell
BY
ATTORNEY

Aug. 24, 1948.   J. C. McCUNE ET AL   2,447,710
DECELERATION CONTROL APPARATUS
Filed April 29, 1944   3 Sheets-Sheet 3

Fig. 4

INVENTORS
Joseph C. McCune
George K. Newell
BY
ATTORNEY

Patented Aug. 24, 1948

2,447,710

UNITED STATES PATENT OFFICE 2,447,710

DECELERATION CONTROL APPARATUS

Joseph C. McCune, Edgewood, and George K. Newell, near Pitcairn, Pa., assignors to The Westinghouse Air Brake Company, Wilmerding, Pa., a corporation of Pennsylvania Application April 29, 1944, Serial No. 533,284

11 Claims. (Cl. 264—1)

This invention relates to deceleration control apparatus and has particular relation to apparatus including a rotary inertia device for detecting the slipping condition of a vehicle wheel and adapted to control the brakes associated with the vehicle wheel in a manner to prevent sliding of the wheel.

The terms "slipping" and "sliding" as applied herein to a vehicle wheel are not synonymous in meaning. The term "slipping" refers to rotation of a vehicle wheel at a speed different from that corresponding to vehicle speed at a given instant. The term "sliding" refers to the dragging of a vehicle wheel, in locked or non-rotative condition, along a road surface or track rail.

A slipping condition of a vehicle wheel may be produced either by an excessive braking torque or an excessive propulsion torque with respect to the adhesion between the vehicle wheel and the road surface or track rail, the rotational speed of the slipping wheel being below that corresponding to vehicle speed when induced by excessive braking torque and above that corresponding to vehicle speed when induced by excessive propulsion torque.

It has been found that the slipping condition of the vehicle wheel, such as a railway car wheel, may be reliably indicated on the basis of deceleration or acceleration of the vehicle wheel at a rate exceeding a certain rate which cannot be attained by the wheel unless the wheel is in a slipping condition. Thus, deceleration of a wheel at a rate exceeding retardation of a car or train at ten miles per hour per second is a reliable indication of the slipping condition of the wheel.

Various types of devices of mechanical or electrical nature have been proposed and employed for the purpose of detecting the slipping condition of a vehicle wheel on the basis of the rate of deceleration or acceleration of the vehicle wheel. A mechanical device proposed for this purpose is of the rotary inertia or fly-wheel type wherein a fly-wheel driven by the wheel yieldingly leads or lags the wheel varying amounts depending upon the rate of deceleration or acceleration respectively of the wheel.

It has been previously proposed to mount a rotary inertia device on the outer end of an axle journal box or casing of a railway car truck in such a manner as to register the slipping condition of the car wheel. The prior copending sole application Serial No. 485,130, of Joseph C. McCune, one of the present joint applicants, which application is assigned to the assignee of this application, discloses such an arrangement.

It is an object of our present invention to provide a rotary inertia device of the type disclosed in application Serial No. 485,130 and characterized by certain improvements which simplify the construction thereof and reduce the cost without in any way sacrificing the sensitivity of the device or its ability to withstand the severe road shock to which it is subjected.

More particularly, it is an object of our present invention to provide a rotary inertia device of the type indicated in the foregoing object and characterized by a novel arrangement for associating the fly-wheel of the rotary inertia device and the spindle on which it is mounted in a manner to attain substantially the same operating characteristics as in application Serial No. 485,130.

The above objects, and other objects of our invention which will be made apparent hereinafter, are attained in an embodiment of our invention subsequently to be described and shown in the accompanying drawings, wherein.

Description

We have shown a simplified fluid pressure brake control apparatus for railway cars and trains of the straight-air type to illustrate the manner in which our invention may be employed in connection with the control of the brakes. It will be understood, however, that our invention is not limited, in its use, to the control of brakes but may be employed in connection with propulsion control apparatus for the purpose of controlling the rate of acceleration of vehicle wheels or for any other desired purpose.

Figure 1:
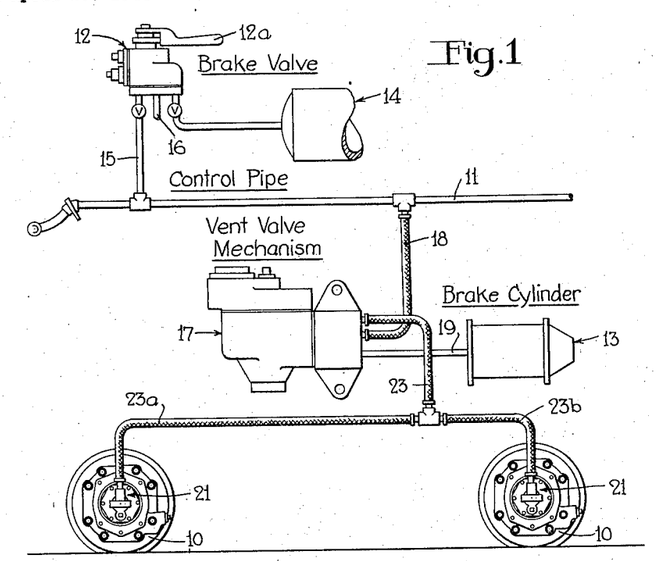
Fig. 1 is a simplified diagrammatic view showing a fluid pressure brake control apparatus for a railway car truck employing rotary inertia devices constructed according to our present invention.

The brake control apparatus is shown in Fig. 1 in connection with a four-wheel type of car truck having two wheel or wheel-and-axle units, each wheel unit comprising a pair of wheels fixed at opposite ends of a connecting axle. In Fig. 1, only one wheel 10 of each wheel unit is shown.

The brake control apparatus comprises a control pipe 11, the pressure of fluid in which is varied under the control of a brake valve 12 of the self-lapping type to correspondingly control the pressure in a brake cylinder 13. A reservoir 14 suitably charged to a certain normal pressure by means of an air compressor, not shown, provides the source of fluid under pressure for charging the control pipe 11.

The brake valve 12 is of the well known self-lapping type having an operating handle 12a for effecting rotation of the rotary operating shaft that in turn controls a self-lapping valve mechanism of the brake valve. In the normal or brake release position of the brake valve handle the brake valve mechanism is conditioned to establish communication through which the control pipe 11 is vented to atmosphere by way of a branch pipe 15, connecting the brake valve and the control pipe, and an exhaust port and pipe 16 at the brake valve. When the brake valve handle 12a is shifted out of its brake release position into a so-called application zone, the exhaust communication for the control pipe is closed and a supply communication is established between the reservoir 14 and the branch pipe 15 of the control pipe 11 to cause fluid under pressure to be supplied to charge the control pipe. The valve mechanism of the brake valve is automatically self-lapping in accordance with the degree of displacement of the brake valve handle out of its brake release position to correspondingly vary the degree of pressure established in the control pipe.

If for any reason such as leakage or any other reason, the pressure in the control pipe tends to reduce, the valve mechanism of the brake valve is automatically operative to reestablish the supply communication from the reservoir 14 to the control pipe 11 to maintain a pressure therein corresponding to the position of the brake valve handle in its application zone.

A so-called vent valve mechanism 17 is provided for controlling a communication between the control pipe 11 and the brake cylinder 13 as well as communication between the brake cylinder 13 and atmosphere.

The vent valve mechanism 17 and the brake cylinder 13 are carried on the spring supported part of the car truck frame (not shown) and consequently have relative movement with respect to the car wheels 10 as well as with respect to the car body. A flexible conduit or pipe 18 is accordingly employed to provide a connection between the vent valve mechanism 17 and the control pipe 11 which is located on the car body. A pipe 19, which may be rigid in construction, connects the vent valve mechanism 17 to the brake cylinder 13.

The details of construction and operation of vent valve mechanism 17 are disclosed in the above-mentioned copending sole application, Serial No. 485,130 of Joseph C. McCune. In view of the fact that reference may be had to the said copending application, it is deemed unnecessary to show and describe the construction and operation of vent valve mechanism 17 in detail herein.

For purposes of the present application, therefore, it is deemed sufficient to state that the vent valve mechanism 17 is so constructed and arranged as to normally provide communication between the pipes 18 and 19 so that, upon charging of the control pipe 11, fluid at a corresponding pressure is supplied from the control pipe to the brake cylinder 13. The vent valve mechanism 17 is operative, however, under the control of rotary inertia devices 21 associated respectively with the several wheel units of the truck carrying the vent valve mechanism 17 and brake cylinder 13, to close communication between the pipe 18 and the pipe 19 and establish communication between the pipe 19 and atmosphere, thereby venting fluid under pressure from the brake cylinder 13.

The construction and operation of the vent valve mechanism 17 is, moreover, such that a predetermined cycle of operation of the vent valve mechanism is initiated in response to operation of one or both of the rotary inertia devices 21. Such cycle of operation results in the reduction of the pressure in the brake cylinder 13 to a certain low pressure, such as five pounds per square inch, and the subsequent resupply of fluid under pressure to the brake cylinder to effect reapplication of the brakes.

The vent valve mechanism 17 is controlled pneumatically by the rotary inertia devices 21 through a flexible pipe or conduit 23 that is connected to the vent valve mechanism 17 and that has two branches 23a and 23b respectively connected to the several rotary inertia devices 21.

The rotary inertia devices 21 associated with the several wheel units are identical in construction and operation. A description of only the one rotary inertia device 21 associated with the left-hand wheel-and-axle unit is thus deemed sufficient for the purpose of explaining the manner and the circumstances under which operation of the several rotary inertia devices 21 is effected.

Figure 2:
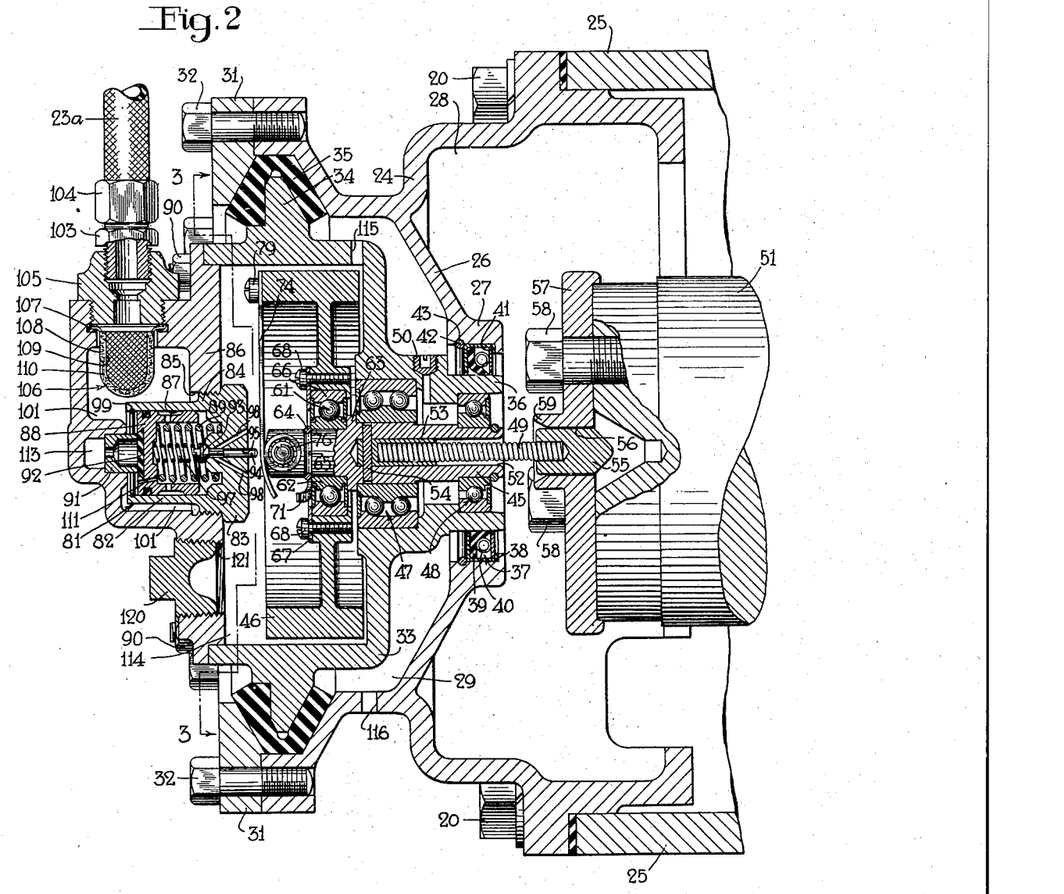
Fig. 2 is an enlarged vertical sectional view showing the details of a rotary inertia device embodying our invention.
Figure 3:
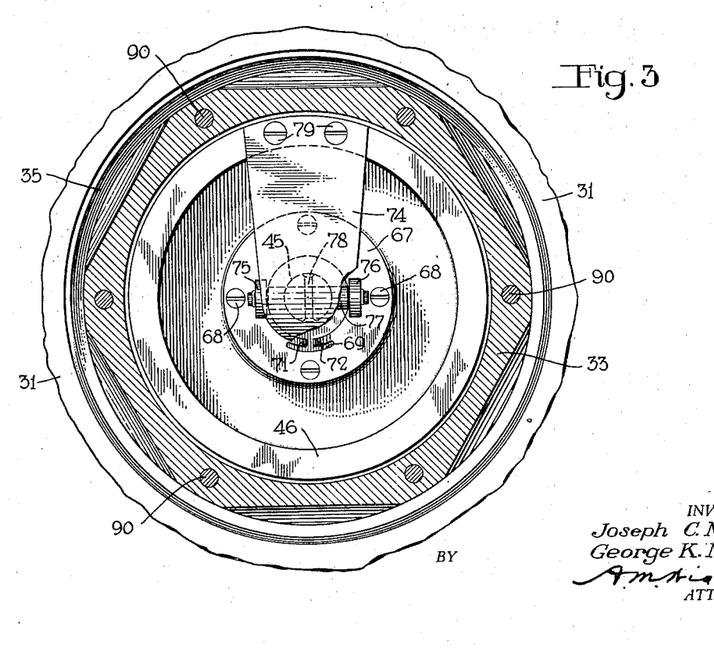
Fig. 3 is a sectional view taken on the line 3—3 of Fig. 2 showing further details of the rotary inertia device.
Figure 4:
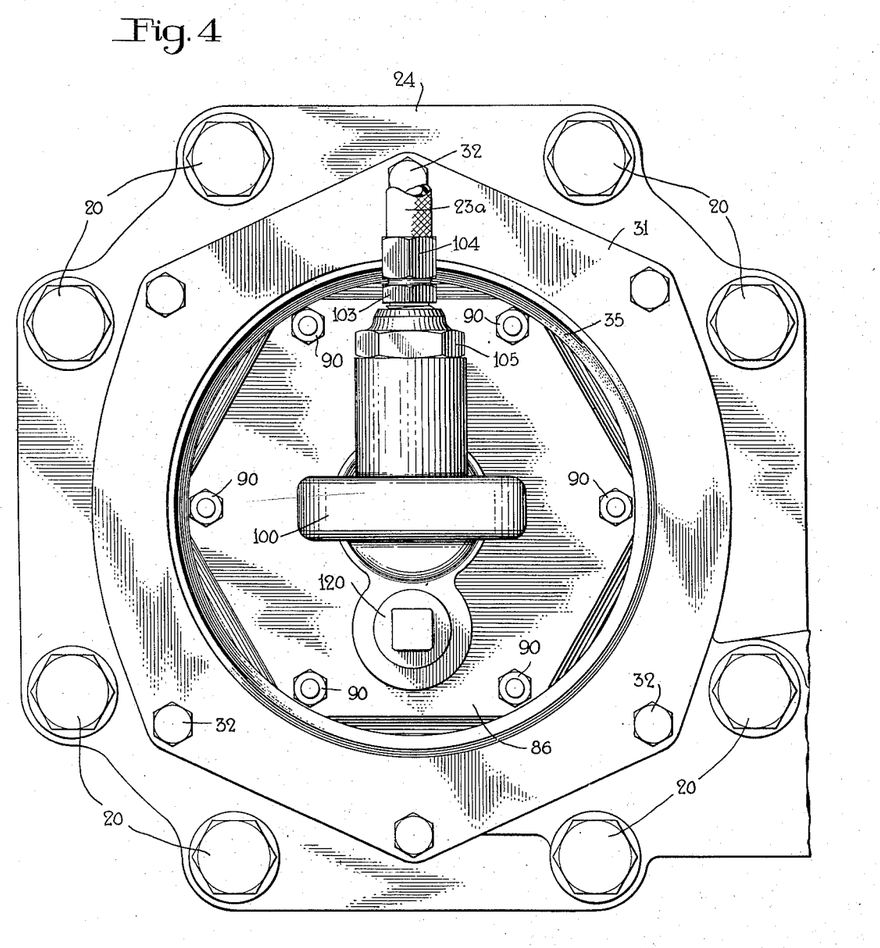
Fig. 4 is an enlarged end view of an axle journal casing showing in further detail the manner in which our novel rotary inertia device is attached thereto.

Referring to Figures 2, 3, and 4, the rotary inertia device 21 comprises a housing, hereinafter designated the adapter ring 24, which is secured to the end of the axle journal casing 25 in place of the usual disk-type and cover, by the same screws 20 employed for the latter. Formed integral with the adapter ring 24 on the interior thereof is an annular web 26 that supports a hub 27 concentrically within the ring 24. The web 26 separates the interior of the adapter ring 24 into two compartments or chambers, one chamber 28 being open inwardly to the interior of the journal casing 25 and the other chamber 29 opening outwardly.

The outer end portion of the adapter ring 24 is flared outwardly in conical manner and is provided with an end flange to which a clamping ring 31 is secured as by a plurality of screws 32.

Removably secured in concentric relation to the adapter ring 24 within the chamber 29 is a cup-shaped housing member 33 having an annular projection 34 on the periphery of the cylindrical portion thereof. A cushioning ring 35, of rubber composition and substantially V-shaped cross section, is disposed between the annular extension 34 of the housing 33 and the correspondingly V-shaped annular groove formed by the cooperation of the clamping ring 31 and the conical end portion of the adapter ring 24.

The inner end of the housing member 33 is formed as a hub extension 36 that extends into and is concentrically supported within the hub 27 at the center of the annular web 26. A suitable sealing ring 37 is interposed between the hub extension 36 and the hub 27 for the purpose of preventing oil in the compartment or chamber 28 and the journal casing 25 from passing to the chamber 29. As shown, the sealing ring 37 may comprise an annular channel member 38 containing an annular sealing member 39, of rubber or rubber composition, the annular sealing lip of which engages the peripheral surface of the hub extension 36. A coil spring annulus 40 confined in the channel 38 serves to assist in maintaining a seal between the sealing lip and the hub extension 36.

As shown in Fig. 2, the sealing ring 37 is secured in hub 27 between a shoulder 41 and a removable snap-ring 42 engaged in an annular groove 43 on the interior surface of the hub 27.

Rotatively mounted on a rotary spindle or shaft 45 and disposed within the housing member 33 is a fly-wheel 46. The spindle 45 is in turn, rotatively mounted in the hub extension 36 of the housing member 33 as by a pair of ball bearing races 47 and 48 disposed at opposite ends of the hub extension 36. Lubrication for these races is supplied through a removable screw plug 50 in the hub 36. The spindle 45 is connected by a flexible shaft 49 to the end of the wheel axle 51 that is rotatively supported in conventional manner in the journal casing 25. As shown in Fig. 2, the spindle 45 has a longitudinal bore 52 therein for receiving the flexible shaft 49, the end of the flexible shaft 49 in the bore 52 having a sleeve 53 suitably secured thereto and fitting closely in the bore 52. A pin 54 that extends transversely through the spindle and the solid end portion of the sleeve 53 serves to secure this end of the flexible shaft to the spindle.

The opposite end of the flexible shaft 49 is coupled to the end of axle 51 by means of a rigid member 55, of polygonal cross section, secured thereto that extends slidably into a central hole 56 of corresponding contour formed in an end plate 57, that is secured, as by a plurality of screws 58 to the end of the axle 51. An outwardly projecting cylindrical boss 59 is provided at the center of the end plate to provide a suitable bearing area for the member 55. The end of the hole in the boss 59 is flared outwardly and the end of the member 55 is conical so as to assist in inserting the member 55 in the opening 56.

It will thus be seen that the flexible shaft 49 forms a driving connection from axle 51 to spindle 45 in such a manner as to permit relative movement therebetween as a result of end-play of the axle 51 as well as possible slight relative vertical movement between the axle and the journal casing 25.

The fly-wheel 46 is rotatively mounted on the outer end of the spindle 45 by means of a ball bearing race 61. The inner ring 62 of the bearing race 61 is secured on the spindle between an annular shoulder 63 and a removable snap-ring 64 engaging in an annular groove 65 on the spindle. The outer bearing ring 66 of the bearing race 61 is fixed in the hub of the fly-wheel 46 by an annular retainer plate 67 that is removably secured to the end of the hub as by a plurality of screws 68. A T-shaped slot 69 (Fig. 3) is provided on the internal periphery of the retainer plate 67 whereby to form two spaced tongues or fingers 71 and 72 that are bent outwardly in a curved manner for a purpose presently to be explained.

The fly-wheel 46 is further associated with the spindle 45 in such a manner as to be driven by rotation of the spindle through a combination lost-motion and yielding connection provided by the cooperation of a leaf spring 74, attached to the outer rim of the fly-wheel 46, and a pair of spaced rollers 75 and 76 that are rotatively mounted on a small shaft 77 fixed, as by a pin 78, in a suitable bore in the spindle, at right angles to the axis of rotation of the spindle.

The leaf spring 74 is disposed radially of the fly-wheel 46 and is attached to the rim of the fly-wheel as by a plurality of screws 79 adjacent the outer end of the leaf spring. The leaf spring is of such length that the inner or free end terminates on the side of the spindle opposite the secured end thereof. The free end of the leaf spring 74 is curved inwardly toward the end of the axle 51, substantially from a line intersecting the axis of rotation of the spindle 45, into the plane of endwise rotation of the shaft 77 carrying the rollers 75 and 76.

The arrangement of the leaf spring 74 and the rollers 75 and 76 is such as to permit a rotary lost-motion between the fly-wheel 46 and the spindle 45 sufficient to insure at least one complete revolution of the balls of the ball bearing race 61 before the cooperative action of either of the rollers 75 or 76 with the inwardly curved free end of the spring 74 causes the spring 74 to exert a yielding resisting force to further relative rotary movement between the fly-wheel and the spindle. Uniformly distributed wear and improved lubrication of the bearing balls is attained by this arrangement, thereby providing a desirably long service life without servicing or repair of the ball bearing races.

The association of a fly-wheel and its driving spindle in a rotary inertia device in such a manner as to obtain the results just described has been previously disclosed and claimed in the abovementioned prior copending application Serial No. 485,130 of Joseph C. McCune. The manner in which we associate the fly-wheel with the driving spindle in the present application is, however, specifically different than that of the copending McCune application just referred to and constitutes one of the features of our present invention.

It will be observed that the leaf spring 74 serves in a dual capacity, namely (1) as a resilient means for yieldingly resisting relative rotary movement between the fly-wheel and its associated spindle and (2) by reason of the inwardly curved free end thereof, as the equivalent of a cam element cooperating with the rollers 75 and 76 on the spindle. The construction we have thus provided greatly simplifies the device as a whole and reduces the cost thereof with respect to the construction and cost of the apparatus disclosed in the copending sole McCune application Serial No. 485,130.

The ultimate degree of rotary movement of the fly-wheel 46 with respect to the spindle 45 is determined by the cooperation of the rollers 75 and 76 with the stop fingers 71 and 72 respectively on the annular retainer plate 67 attached to the fly-wheel hub. Referring to Fig. 3, it will be seen that if the fly-wheel 46 rotates in a clockwise direction with respect to the spindle 45, the roller 75 will ultimately engage the stop finger 71 to limit the degree of rotary movement of the fly-wheel with respect to the spindle in this direction. Conversely, if the fly-wheel 46 rotates in a counter-clockwise direction with respect to the spindle 45, the roller 76 will ultimately engage the stop finger 72 to limit the rotary movement of the fly-wheel with respect to the spindle in this direction. It will be apparent that the maximum angle through which the fly-wheel and spindle have relative movement is substantially 180°. It will be understood that the relative rotary movement of the fly-wheel 46 with respect to the spindle 45 is produced by reason of deceleration or acceleration of the axle 51, the amount of outward bending of the leaf spring 74 varying depending upon the rate of deceleration or acceleration of the axle 51.

We have so designed and constructed the leaf spring 74 in relation to the dimensions and weight of the fly-wheel 46 as well as the speed at which the axle 51 rotates that a certain predetermined amount of outward flexing of the leaf spring is not produced unless the rotative deceleration or acceleration of the axle 51 exceeds a rate or value corresponding to retardation of the car or train at ten miles per hour per second. Since, as previously explained, the rotative deceleration or acceleration of a vehicle wheel of a railway car wheel or axle at a rate corresponding to retardation of the train at ten miles per hour per second or more is a positive indication of a slipping condition of the wheel, it will be apparent that the predetermined outward movement of the leaf spring 74 is not effected unless the car wheels fixed on axle 51 are in a slipping condition.

According to our present invention, the outward movement of the leaf spring 74 to a degree exceeding the predetermined amount is utilized to effect the operation of a pilot valve device 81 which, in turn, serves to initiate the operation of the vent valve mechanism 17 in the manner hereinbefore referred to and presently to be more fully explained.

The pilot valve device 81 comprises a tubular casing 82 open at one end and closed at the opposite end by a head having a nut portion 83 and adjacent threaded portion 84 that cooperates with a threaded opening 85 in an end plate 86 that is attached, as by a plurality of screws 90, to the housing member 33 in a manner to close the open end thereof.

Disposed and operating in the cylindrical bore 87 formed in the interior of the casing 82 is a cup-shaped valve piston 88. Interposed between the base of the bore 87 and the inner face of the valve piston 88 is a coil spring 89 that yieldingly urges the valve piston into seated relation on an annular valve seat or seat bushing 91 secured in the end plate 86. A gasket 92, of rubber or other similar material is fixed in the outer face of the valve piston 88 for providing a tight seal between the valve piston and the seat bushing 91.

An auxiliary valve 93, of the poppet type, is disposed within the bore 87 between the valve piston 88 and the casing 82, and has a guide stem 94 that projects slidably through a suitable hole 95 in the head 83 and terminates short of the flexible spring 74. The axis of the stem 94 is coincident with the axis of rotation of the spindle 45 so that the stem has a single-point contact with the outer face of spring 74 when the spring is flexed outwardly while the fly-wheel 46 is rotating. The amount of clearance between the end of the stem 94 and the outer face of leaf spring 74 is such that the stem 94 is not engaged by the leaf spring unless the spring is flexed outwardly more than the certain predetermined amount previously referred to.

A coil spring 97, concentrically disposed within the larger coil spring 89 in interposed relation between the auxiliary valve 93 and the inner face of the valve piston 88, yieldingly urges the auxiliary valve 93 into seated relation in a cooperating valve seat formed on the inner face of the head of the casing 82.

A portion of the stem 94 of the auxiliary valve 93 is fluted and a plurality of vent ports 98 are provided in the head of the casing 82 so as to provide passages through which fluid under pressure may be vented from the interior of the casing 82, when the auxiliary valve 93 is unseated. A removable snap-ring 99, engaging in a suitable annular groove formed on the interior surface of the cylindrical portion of the casing 82, serves to prevent separation of the valve piston 88 from the casing 82 when the casing is unscrewed and thereby removed from the end plate 86. The snap-ring 99 is so located as not to interfere with the full seating of the valve piston 88 on the seat bushing 91 when the casing valve casing 82 is fully screwed into the end plate 86.

The body of the casing 82 extends into and is surrounded by a chamber 101, formed in a T-shaped extension 100 of the end plate 86. (See Fig. 4.) Fluid at a pressure corresponding to that established in control pipe 11 and brake cylinder 13 is supplied through the flexible pipes 23 and 23a from the vent valve mechanism 17 to chamber 101 whenever the control pipe 11 is charged with fluid under pressure to effect an application of the brakes.

Pipe 23 has a union coupling at the end thereof comprising a stud fitting 103 and a union nut 104, the stud fitting 103 being screwed into a screw plug 105 that is, in turn, screwed into a threaded opening in the extension 100 of end plate 86 communicating with the chamber 101. A cup-shaped strainer 106 projects downwardly into the chamber 101 and is secured in the outlet opening of the chamber 101 by the screw plug 105 which clamps the peripheral flange of the strainer. An annular sealing ring 107 of rubber or similar material is provided on the flange for providing air-tight seal.

The strainer 106 comprises an outer cup 108 and inner cup 109 of screen mesh having suitable filtering material 110, such as felt, interposed therebetween.

Fluid under pressure supplied to chamber 101 flows through a port 111 in valve piston 88 at the outer seated area thereof to the chamber formed on the interior of the valve piston, thereby equalizing the pressures on opposite sides of the valve piston. Spring 89 thus acts to maintain the valve piston 88 seated on the seat bushing 91.

The inner seated area of the valve piston 88 is open through the interior passage formed within the seat bushing 91 to a curved passage 113, formed in the projection 100 of end plate 86. Both ends of passage 113 terminate at the interior face of the end plate 86 and thus open into the chamber 114 formed within the housing member 33.

The chamber 114 is connected to the chamber 29 within the adapter ring 24 through one or more ports 115 in the wall of the housing member 33. Chamber 29 is constantly open to atmosphere through one or more ports 116 in the wall of the ring 24. It will thus be seen that a labyrinthean exhaust passage is provided through which fluid in the chamber 101 may be exhausted to atmosphere, upon the unseating of the valve piston 88 from the seat bushing 91. By reason of the location of ports 116, clogging of the exhaust passage due to dirt, dust and the like is rendered unlikely.

The unseating of the valve piston 88 is effected in response to the unseating of the auxiliary valve 93 in response to the outward flexing of the leaf spring 74 in the manner previously described. When the valve 93 is unseated, the fluid under pressure on the interior of the valve piston 88 is vented at a rapid rate through the exhaust ports 98 to the chamber 114 and thence successively through the ports 115 and 116 to atmosphere. A pressure differential is thus created on the valve piston 88 due to the relatively slow rate at which fluid under pressure is supplied through the port 111 in the valve piston from the chamber 101, which differential fluid pressure is effective to unseat the valve piston 88 from the valve seat 91 in opposition to the spring 89.

With the valve piston 88 unseated, fluid under pressure is vented from the chamber 101 and accordingly from the vent valve mechanism 17 at a rapid rate by way of the passage 113, chamber 114, exhaust ports 115, chamber 29 and ports 116.

A screw plug 120 is provided in the end plate 86 for closing an opening 121 in the end plate that provides access to the fly-wheel 46 for manual rotation of the fly-wheel to test the operation of the pilot valve device 81.

The character of the vent valve mechanism 17 is such that when fluid under pressure is vented to atmosphere through the pipes 23 and 23a by operation of the pilot valve device 81, the operation of the vent valve mechanism to effect reduction of the pressure in the brake cylinder 13 to a predetermined low value and then restoration of the pressure in the brake cylinder is automatically effected.

Operation

The operation of the equipment should be apparent from the previous description of the apparatus. A brief description of the general operation, it is believed, will however be helpful in arriving at a clear understanding of the invention.

Let it be supposed that the engineer of the train has effected an application of the brakes in the manner previously described and that fluid under pressure has accordingly been supplied to the brake cylinder 13 and through the pipe 23 and branch pipes 23a and 23b to the chamber 101 associated with the pilot valve device 81 of the several rotary inertia devices 21. If either of the wheel and axle units on the car truck shown in Fig. 1 begins to slip, the corresponding pilot valve device 81 is operated in the manner previously described to vent fluid under pressure from the vent valve mechanism 17. The vent valve mechanism 17 is accordingly operated to close-off the supply of fluid under pressure to the brake cylinder 13 and to vent fluid under pressure from the brake cylinder at a rapid rate, the pressure in the brake cylinder being automatically reduced to a low value, such as five pounds per square inch, and then automatically restored to the original pressure in the control pipe 11.

Due to the reduction of the pressure in the brake cylinder 13 effected by operation of the vent valve mechanism 17, the slipping wheels promptly cease to decelerate and then accelerate back toward a speed corresponding to train speed. It will be apparent, therefore, that the fly-wheel 46 will be first shifted rotatively in a leading direction with respect to the direction of rotation of spindle 45 during the decelerating portion of the slipping cycle and then shifted reversely in a lagging direction with respect to the direction of rotation of the spindle 45 during the accelerating portion of the slipping cycle. As long as the wheels fixed to the axle 51 are decelerating or accelerating at a rate corresponding to the retardation of acceleration of the train at ten miles per hour per second, the resultant outward flexing of the leaf spring 74 will be sufficient to maintain the auxiliary valve 93 of the pilot valve device 81 unseated. As long as the auxiliary valve 93 is unseated, the valve piston 88 will remain unseated, unless the pressure of the fluid in the chamber 101 is sufficiently depleted to permit the spring 89 to reseat the valve piston 88.

As far as the operation of the vent valve mechanism 17 is concerned it is immaterial whether the valve piston 88 is unseated or not, once the operation of the vent valve mechanism 17 is initiated in response to the initial venting of fluid under pressure by operation of the pilot valve device 81.

Due to the fact that the length of time required for the pressure in the brake cylinder 13 to be reduced to five pounds per square inch is longer than the time required for the slipping wheels to be restored to train speed, the leaf spring 74 will be restored inwardly to a sufficient degree, due to the restoration of the wheels to a deceleration rate corresponding to the deceleration or retardation of the train (three or four miles per hour per second) before the vent valve mechanism 17 operates to resupply fluid under pressure to the brake cylinder 13. In such case, therefore, the auxiliary valve 93 of the pilot valve device 81 will have been restored to seated position due to the inward movement of the leaf spring 74. Upon restoration of the auxiliary valve 93 to seated position, the fluid pressure forces on the valve piston 88 are promptly equalized through the communicating port 111 in the valve piston and the spring 89 thus becomes effective to promptly seat the valve piston 88 to cut-off further venting of fluid under pressure from the chamber 101 and the connected vent valve mechanism 17.

It should be understood, therefore, that with the pilot valve device 81 closed, the vent valve mechanism 17 will operate to restore the communication through which fluid under pressure is resupplied to the brake cylinder 13 immediately following the reduction of brake cylinder pressure to a low value of five pounds per square inch. The pressure in the brake cylinder 13 will thus be restored to the pressure established in the control pipe 11 and the brakes will be correspondingly reapplied.

If for any reason, the pilot valve device 81 should remain or stick in its unseated position so as to continue to vent fluid under pressure from the vent valve mechanism 17, the vent valve mechanism will continue to vent fluid under pressure from the brake cylinder 13 until such time as the pilot valve 81 is reseated and further venting of fluid under pressure from the vent valve mechanism 17 thus terminate. In such case the pressure in the brake cylinder may be completely reduced to atmospheric pressure.

If, upon the resupply of fluid under pressure to the brake cylinder 13 by operation of the vent valve mechanism 17 as just described, the wheels again begin to slip, the above operation is repeated. It is thus possible that during a single brake application, a number of cycles, each consisting of reduction of brake cylinder pressure to five pounds per square inch and restoration of the brake cylinder pressure to that established in the control pipe 11, may occur. In other words, alternate release and reapplication of the brakes on the slipping wheels may be repeatedly effected. A certain amount of effective braking effort may thus be lost but the percentage of effective braking effort with respect to the maximum theoretically obtainable will still be relatively high. It will thus be seen that even though a relatively large number of wheels on a train may slip, the brakes on the train are for all practical purposes continuously applied so that the stopping distance of the train is not lengthened to any substantial extent by reason of operation of the rotary inertia devices 21.

When the train comes to a stop in response to a brake application, the pilot valve device 81 of each rotary inertia device 21 is always closed, and consequently the vent valve mechanisms 17 on each car throughout the train are all restored to their normal condition in which fluid under pressure is supplied to brake cylinders 13 according to the pressure of the fluid in the control pipe 11. The brakes accordingly remain applied on the train until such time as the fluid pressure in the control pipe 11 is reduced to atmospheric pressure by operation of the brake valve 12 prior to again starting the train.

Summary

It will be seen that we have disclosed a so-called deceleration control apparatus comprising a rotary inertia device illustratively shown in connection with the wheel and axle units of railway cars and trains for the purpose of controlling the brakes associated with the wheels in a manner to prevent the sliding thereof.

Our invention relates primarily to the construction of the rotary inertia devices which, while illustrated in connection with the control of the brakes on railway cars and trains, are adapted for various uses other than the control of the brakes, as for example, the operation of a signal device to indicate a predetermined rate of deceleration or acceleration of any rotary element or the control of acceleration or propulsion of vehicles, such as railway cars and trains. It will be understood, therefore, that it is not our intention to limit the scope of our invention except in accordance with the terms of the appended claims.

One of the novel features of the rotary inertia device we have disclosed herein lies in the manner of associating the fly-wheel with its driving spindle through the cooperation of a leaf spring carried by the fly-wheel and rollers carried by the spindle so that the leaf spring serves in the dual capacity of a yielding means and of a cam means, to cause the relative rotative movement of the fly-wheel with respect to the spindle to be determined according to the rate of acceleration or deceleration of the driving spindle.

Another feature of our invention lies in the cooperative action of a non-rotative valve device with the rotating parts of the rotary inertia device whereby operation of the valve device is effected.

The above features and other features of our invention are hereinafter more fully set forth in the appended claims.

Having now described our invention, what we claim as new and desire to secure by Letters Patent is:

1. A rotary inertia device comprising a rotary element adapted to be rotatably accelerated and decelerated, a fly-wheel, resilient yielding means carried by the fly-wheel, means on said rotary element cooperating with said resilient means in a manner to provide the sole driving connection between the rotary element and the fly-wheel, said resilient yielding means and said means on said rotary element cooperating in a manner characterized by unresisted rotative movement of the fly-wheel with respect to the rotary element through a predetermined angle and yieldingly resisted rotative movement of the fly-wheel with respect to the rotary element beyond either extremity of the predetermined angle, and means operatively responsive to movement of said resilient yielding means incidental to the yieldingly resisted movement of the fly-wheel with respect to the rotary element.

2. A rotary inertia device comprising a rotary element adapted to be rotatably accelerated and decelerated, a fly-wheel, resilient yielding means carried by the fly-wheel, means on said rotary element cooperating with said resilient yielding means to provide the sole driving connection between the rotary element and the fly-wheel, the relation between said resilient means and the means on the rotary element being such that the fly-wheel is free to rotate unresistedly with respect to the rotary element through a predetermined angle and also such that rotative movement of the fly-wheel with respect to the rotary element beyond the extremities of the said predetermined angle is so yieldingly resisted with an increasing force as to vary substantially according to the rate of deceleration or acceleration of the rotary element, and means operatively responsive only to more than a certain amount of movement of said resilient means incidental to the yieldingly resisted movement of the fly-wheel with respect to the rotary element.

3. A rotary inertia device comprising a rotary element, a fly-wheel, a leaf spring element secured to the fly-wheel, a pair of rollers carried by said rotary element, said leaf spring element being attached at one end to the peripheral portion of the fly-wheel in spaced axial relation to said rollers and having its opposite or free end projecting into the plane of rotation of the axis of said rollers so as to cooperate with said rollers in a manner to provide unresisted rotative movement of the fly-wheel with respect to the rotary element through a predetermined angle and yieldingly resisted rotative movement of the fly-wheel with respect to the rotary element beyond the extremities of the predetermined angle, and means operatively responsive only to the yieldingly resisted movement of the fly-wheel with respect to the rotary element.

4. A rotary inertia device comprising a rotary element, a fly-wheel, a plurality of rotatable bearing elements interposed between the fly-wheel and the rotary element for mounting the fly-wheel rotatably on said rotary element, resilient yielding means carried by the fly-wheel, means on said rotary element cooperating with said resilient yielding means in a manner to provide unresisted rotative movement of the fly-wheel with respect to the rotary element through a predetermined angle sufficient to permit the rotation of the rotatable bearing elements through at least one complete revolution and yieldingly resisted rotative movement of the fly-wheel with respect to the rotary element beyond the extremities of the predetermined angle, and means operatively responsive to the yieldingly resisted movement of the fly-wheel with respect to the rotary element.

5. A rotary inertia device comprising a rotary element adapted to be rotatively accelerated and decelerated, a fly-wheel rotatably mounted on said rotary element, a driving connection between said rotary element and said fly-wheel consisting only of a leaf spring element secured to the fly-wheel and a pair of rollers carried by said rotary element, said leaf spring element being secured at one end to the peripheral portion of the fly-wheel and the free end thereof extending into cooperative relation with said rollers in a manner to provide unresisted rotative movement of the fly-wheel with respect to the rotary element through a predetermined angle and yieldingly resisted rotative movement of the fly-wheel with respect to the rotary element beyond the extremities of the predetermined angle substantially in accordance with the rate of acceleration or deceleration of the rotary element, said leaf spring element being yieldingly flexed a varying amount corresponding to the yieldingly resisted movement of the fly-wheel with respect to the rotary element, and non-rotative means adapted to be engaged and operated by said leaf spring element upon a predetermined flexing movement thereof.

6. A rotary inertia device comprising a rotary element adapted to be rotatively accelerated and decelerated, a fly-wheel rotatably mounted on said rotary element, a driving connection between said rotary element and said fly-wheel consisting only of a leaf spring element secured to the fly-wheel and a pair of rollers carried by said rotary element, said leaf spring element being attached at one end to the peripheral portion of the fly-wheel and having its opposite end free, the free end of said leaf spring element cooperating with said rollers in such a manner as to provide unresisted rotative movement of the fly-wheel with respect to the rotary element through a predetermined angle and yieldingly resisted rotative movement of the fly-wheel with respect to the rotary element beyond the extremities of the predetermined angle substantially in accordance with the rate of acceleration or deceleration of the rotary elements, said leaf spring element being yieldingly flexed a progressively varying amount corresponding to the degree of yieldingly resisted movement of the fly-wheel with respect to the rotary element, and a non-rotative member disposed in coaxial alignment with said rotary element and adapted to be engaged and operatively moved by said leaf spring element in response to more than a certain amount of flexing movement thereof incident to the yieldingly resisted movement of the fly-wheel with respect to the rotary element.

7. A rotary inertia device comprising a rotary element adapted to be rotatively accelerated and decelerated, a fly-wheel rotatably mounted on said rotary element, a leaf spring element secured at one end to the rim of the fly-wheel, a pair of rollers rotatable on a common axis that is fixedly carried by and rotatable with said rotary element in spaced parallel relation to said leaf spring element, said leaf spring element having its opposite end free and projecting into the plane of rotation of the axis of said rollers so as to cooperate with the rollers in a manner to provide the sole driving connection between the fly-wheel and the rotary element, said driving connection being characterized by unresisted rotative movement of the fly-wheel with respect to the rotary elements through a predetermined angle and yieldingly resisted rotative movement of the fly-wheel with respect to the rotary element beyond the extremities of the predetermined angle substantially in accordance with the rate of acceleration or deceleration of the rotary element, said leaf spring element being yieldingly flexed a varying amount corresponding to the yieldingly resisted movement of the fly-wheel with respect to the rotary elements, and valve means including an operating member disposed in coaxial alignment with said rotary element and engaged and moved by the leaf spring element upon more than a certain amount of flexing movement of the leaf spring element incident to the yieldingly resisted movement of the fly-wheel with respect to the rotary element.

8. A rotary inertia device comprising a rotary element adapted to be rotatably accelerated and decelerated, a fly-wheel, a leaf spring element disposed in radial relation to the fly-wheel and having one end secured to the rim of the fly-wheel so as to permit the leaf spring to be yieldingly flexed in an axial direction perpendicular to the plane of rotation of the fly-wheel, a pair of rollers carried by the said rotary element in spaced relation symmetrically on opposite sides of the axis of rotation of the rotary element for rotation on an axis perpendicular to the axis of rotation of the rotary element, the free end of said leaf spring element extending into the plane of rotation of the axis of said rollers to provide a driving connection between the rotary element and said fly-wheel characterized by unresisted rotative movement of the fly-wheel with respect to the rotary element through a predetermined angle and yieldingly resisted rotative movement of the fly-wheel with respect to the rotary element beyond the extremities of the predetermined angle, and non-rotative means coaxially disposed with respect to said rotary element and cooperating with said leaf spring element in such a manner as to be operated in response to the flexing movement of the leaf spring element incident to the yieldingly resisted movement of the fly-wheel with respect to the rotary element.

9. A rotary inertia device comprising a rotary element adapted to be rotatably accelerated and decelerated, a fly-wheel, a leaf spring element, radially disposed with respect to the fly-wheel, having one end fixed to the fly-wheel at the periphery thereof so that said leaf spring element is flexibly movable in a direction substantially perpendicular to the plane of rotation of the fly-wheel, a pair of rollers carried by said rotary element in symmetrically spaced relation on opposite sides of the axis of rotation thereof and rotatable on an axis substantially perpendicular to the axis of rotation of the rotary element, the free end of said leaf spring element extending into cooperative relation with said rollers in such a manner as to provide a driving connection between said rotary element and said fly-wheel characterized by unresisted rotative movement of the fly-wheel with respect to the rotary element through a predetermined angle without engagement of one or the other of said rollers with the free end of said leaf spring element and yieldingly resisted rotative movement of the fly-wheel with respect to the rotary element beyond the extremities of said predetermined angle by reason of engagement of one or the other of said rollers with the leaf spring element, depending upon the direction of rotative movement of the fly-wheel with respect to the rotary element, the degree of such yieldingly resisted movement being substantially in accordance with the rate of acceleration or deceleration of the rotary element and incidentally resulting in a corresponding amount of outwardly flexing movement of the leaf spring element with respect to the plane of rotation of the fly-wheel, and non-rotative means adapted to be engaged and operated by said leaf spring element upon a predetermined amount of flexing movement of the leaf spring element out of a normal position thereof.

10. A rotary inertia device comprising a rotary element adapted to be rotatably accelerated and decelerated, a fly-wheel, a leaf spring element, radially disposed with respect to the fly-wheel, having one end secured to the fly-wheel adjacent the periphery thereof and the other or free end terminating substantially opposite the end of the rotary element and being flexibly movable in a direction substantially perpendicular to the plane of rotation of the fly-wheel, a pair of spaced rollers carried by said rotary element symmetrically on opposite sides of the axis of rotation thereof and rotatable on an axis substantially perpendicular to the axis of rotation of the rotary element, the free end of said leaf spring element cooperating with said rollers in such a manner as to provide a driving connection between said rotary element and said fly-wheel, characterized by unresisted rotative movement of the fly-wheel with respect to the rotary element through a predetermined angle and yieldingly resisted rotative movement of the fly-wheel with respect to the rotary element beyond the extremities of the predetermined angle, means carried by the fly-wheel cooperating with said rollers for limiting the degree of rotative movement of the fly-wheel with respect to the rotary element to a second predetermined angle greater than the first said predetermined angle, and non-rotative means disposed substantially in coaxial alignment with the axis of rotation of the rotary element and engaged and operated by the leaf spring element in response to a predetermined amount of flexing movement of the leaf spring element out of its normal position incident to the yieldingly resisted rotative movement of the fly-wheel with respect to the rotary element.

11. A rotary inertia device comprising a rotary element adapted to be rotatably accelerated and decelerated, a fly-wheel rotatable coaxially with respect to said rotary element, a leaf spring element disposed radially of the fly-wheel and with the flat face thereof substantially parallel to the plane of rotation of the fly-wheel, said spring element having one end secured to the fly-wheel at the periphery thereof and its opposite or free end terminating substantially opposite the end of said rotary element, and cam means on the free end of said spring element so disposed and arranged as to cooperate with the rotary element in a manner to provide unresisted rotative movement of the fly-wheel with respect to the rotary element through a predetermined angle and yieldingly resisted rotative movement of the fly-wheel with respect to the rotary element beyond the extremities of said predetermined angle, and means operatively responsive only to a predetermined amount of yieldingly resisted rotative movement of the fly-wheel with respect to the rotary element.

JOSEPH C. McCUNE.
GEORGE K. NEWELL.

REFERENCES CITED

The following references are of record in the file of this patent:

UNITED STATES PATENTS

| Number | Name | Date |
|---|---|---|
| 1,560,844 | Olds | Nov. 10, 1925 |